United States Patent [19]

Chase et al.

[11] Patent Number: 5,673,437
[45] Date of Patent: Oct. 7, 1997

[54] VIBRATION ATTENUATING MEMBER AND METHOD OF MAKING SAME

[75] Inventors: David D. Chase, Albuquerque, N. Mex.; Daniel A. Talonn, St. Louis, Mo.

[73] Assignee: Chase Ergonomics Inc., Albuquerque, Minn.

[21] Appl. No.: 623,060

[22] Filed: May 6, 1996

Related U.S. Application Data

[63] Continuation-in-part of Ser. No. 436,655, May 8, 1995, Pat. No. 5,632,045.

[51] Int. Cl.$^6$ .................. A41D 13/00; A41D 13/10; B32B 7/02
[52] U.S. Cl. .................. 2/167; 2/20; 2/161.6; 2/455; 428/316.6; 428/318.4
[58] Field of Search .................. 2/16, 20, 160, 2/161.1, 161.7, 164, 167, 159, 455, 456, 413, 412; 428/316.6, 318.4, 318.6, 319.7, 152, 159, 158, 160, 217, 218, 314.4, 304.4, 309.9, 306.6

[56] References Cited

U.S. PATENT DOCUMENTS

| Re. 34,573 | 4/1994 | Calvert | 2/20 |
|---|---|---|---|
| 3,143,457 | 8/1964 | Morris | 428/217 |
| 3,562,089 | 2/1971 | Warnaka et al. | 428/217 |
| 4,051,553 | 10/1977 | Howard | 2/161 A |
| 4,369,284 | 1/1983 | Chen | 524/476 |
| 4,374,172 | 2/1983 | Schwarz et al. | 428/317.9 |
| 4,618,213 | 10/1986 | Chen | 350/96.34 |
| 4,624,016 | 11/1986 | Luevano | 2/161.1 |
| 4,678,707 | 7/1987 | Shinozaki et al. | 428/323 |
| 4,756,949 | 7/1988 | Spence et al. | 428/159 |
| 4,778,028 | 10/1988 | Staley | 181/208 |
| 4,808,469 | 2/1989 | Hiles | 428/318.6 |
| 4,851,271 | 7/1989 | Moore, III et al. | 428/158 |
| 4,980,386 | 12/1990 | Tiao et al. | 521/108 |
| 5,063,098 | 11/1991 | Niwa et al. | 428/76 |
| 5,121,962 | 6/1992 | Weber et al. | 297/214 |
| 5,153,254 | 10/1992 | Chen | 524/505 |
| 5,159,717 | 11/1992 | Drew et al. | 2/20 |
| 5,214,799 | 6/1993 | Fabry | 2/20 |
| 5,257,418 | 11/1993 | Jaskievicz | 2/20 |
| 5,262,468 | 11/1993 | Chen | 524/476 |
| 5,274,846 | 1/1994 | Kolsky | 2/2 |
| 5,285,529 | 2/1994 | Arena | 2/16 |
| 5,288,813 | 2/1994 | Hirakouchi et al. | 525/438 |
| 5,324,222 | 6/1994 | Chen | 446/34 |
| 5,334,646 | 8/1994 | Chen | 524/474 |
| 5,336,708 | 8/1994 | Chen | 524/474 |
| 5,338,599 | 8/1994 | Barrett | 428/217 |
| 5,345,609 | 9/1994 | Fabry et al. | 2/20 |
| 5,410,756 | 5/1995 | Hutson | 2/16 |
| 5,411,810 | 5/1995 | Hirankouchi et al. | 428/480 |

*Primary Examiner*—Amy B. Vanatta
*Attorney, Agent, or Firm*—Polster, Lieder, Woodruff & Lucchesi

[57] ABSTRACT

A vibration attenuating member includes at least a first layer composed of a viscoelastic material having a Shore 00 durometer of less than 50 and a rebound percentage of less than 20. Preferably the vibration dampener also includes second and third layers, coterminous with the first layer, which are composed of a foam material. The viscoelastic layer may have a non-uniform shape, such as precurved, tapered, or the like. The viscoelastic material may be creased to facilitate bending. The member has a transmissibility no greater than 1.0 in the range of from 31.5 to 200 Hz, and a transmissibility of no more than 0.6 in the range of from 200 Hz to 1250 Hz. The vibration attenuating member may form a glove, a glove liner, a portion of a glove liner, a portion of a glove, a sports glove, a wrap for a tool, or be used in some other application where vibration attenuation is desirable.

29 Claims, 4 Drawing Sheets

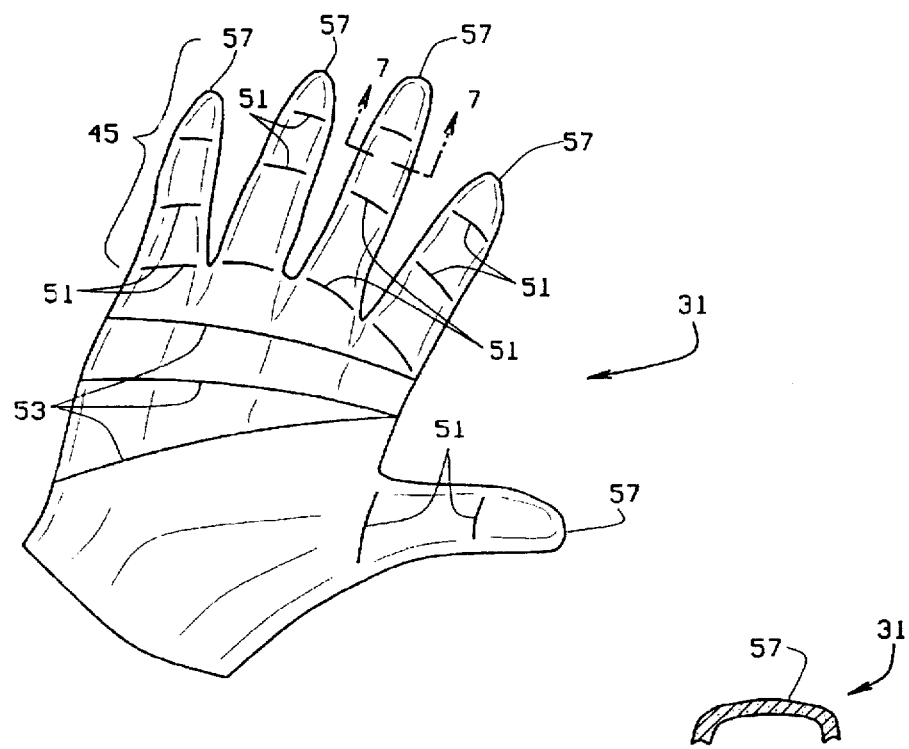
FIG. 6
FIG. 7
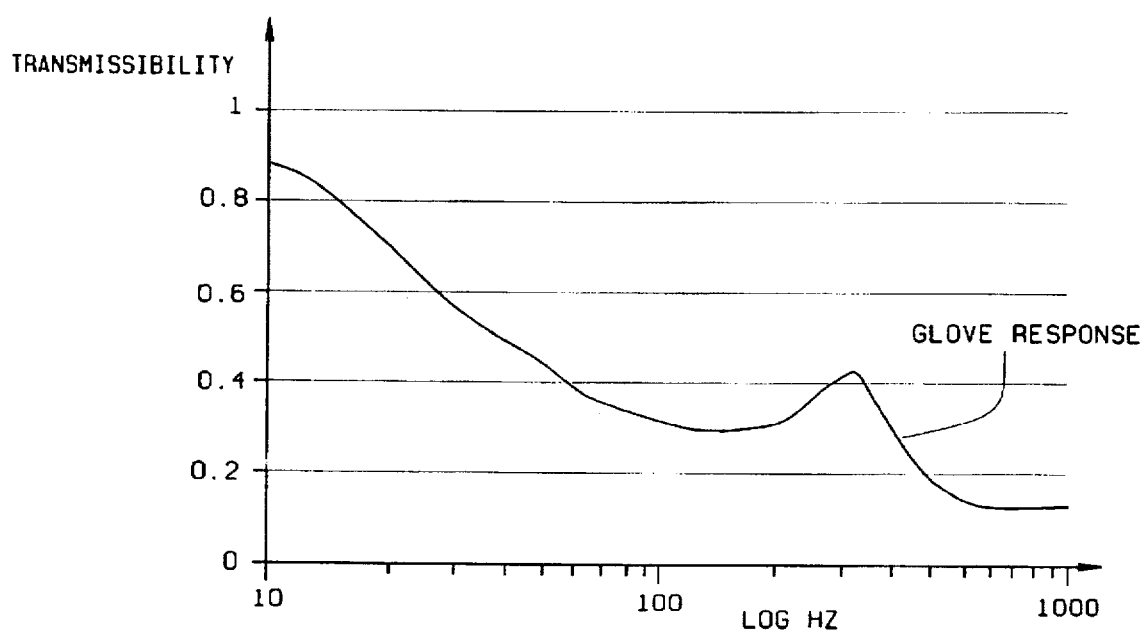
FIG. 8

VIBRATION ATTENUATING MEMBER AND METHOD OF MAKING SAME

CROSS REFERENCE TO RELATED APPLICATION

This application is a continuation-in-part of U.S. application Ser. No. 08/436,655, filed May 8, 1995, now U.S. Pat. No. 5,632,045.

BACKGROUND OF THE INVENTION

This invention relates to vibration attenuation, and more particularly to articles designed to attenuate the vibration encountered in using tools, sports equipment, and the like.

Various hand held tools and pieces of machinery are sources of substantial amounts of vibration during use. Such tools include power saws and drills, rivet guns, jack hammers, and any number of similar tools. Extensive use of such equipment may result in injury to the human user and significant disability.

Protective gloves have been proposed to shield the user from these effects. However, prior art gloves do not completely solve the problem. It has been found that currently available gloves in fact do not adequately attenuate applied vibration. In addition, it has been found that increasing the amount of vibration dampening material in currently available gloves to attempt to meaningfully attenuate vibration results in a glove which is so thick or bulky that manipulation and control of hand tools is significantly impaired. In addition, such gloves tend to be uncomfortable for the user.

Although most of the vibration is transmitted to the user through the user's palm, it is also necessary to protect the user's fingers from vibration. The problems of bulkiness and control are, of course, accentuated in trying to shield the fingers from vibration. Of course, not all vibration attenuation applications require protecting the user's fingers, but it would be helpful to have a vibration attenuating technology which was useful for shielding fingers when desired.

The European Committee for Standardization has enacted certain standards for antivibration gloves to address the problems addressed above, but it is not believed that any prior art gloves meet the standard without increasing the amount of vibration dampening material so much as to severely hinder the manipulation and control of the glove. This standard, CEN/231/3 N70E, provides for measuring the transmissibility (or alternatively, the attenuation) of vibration in two different frequency ranges under conditions specified in the standard. In the lower frequency range, from 31.5–200 Hz, the transmissibility may not exceed 1.0. Thus, in this range the gloves are not allowed to amplify vibration. In the higher frequency range, from 200 Hz to 1250 Hz, the transmissibility must be less than 0.6 (i.e., at least 40% attenuation). That is, in the higher range, the gloves must reduce vibration to 60% or less of the level measured when the operator is not wearing gloves. This standard is hereby incorporated herein by reference, including the testing procedure set forth therein. It should be understood that whenever the term "transmissibility" or its converse "attenuation" is used herein, it is intended that such be measured in accordance with the aforementioned standard.

Moreover, many existing gloves are used with glove liners. Currently available glove liners are not believed to provide clinically significant vibration attenuation, and so vibration attenuation technology is generally not available for those users of glove liners.

In addition, vibration attenuation may be implemented in such a way that no glove is involved. For example, the vibration from a tool may be attenuated by designing the handle of the tool in such a way as to attenuate vibration or by wrapping the handle in vibration attenuating material. Currently available vibration attenuating members are not believed, however, to provide satisfactory vibration attenuation when used as part of a tool. A similar situation exists for sporting equipment.

SUMMARY OF THE INVENTION

Among the various objects and features of the present invention may be noted the provision of an improved vibration attenuating member which reduces vibrating induced injury to a human user.

Another object is the provision of such a vibration attenuating member which meets the European standard.

A third object is the provision of such a vibration attenuating member which is relatively comfortable to wear and does not unduly restrict the movements of a human wearer.

A fourth object is the provision of such a vibration attenuating member which protects not only the palm and wrist, but also the fingers of a human wearer.

Other objects and features will be in part apparent and in part pointed out hereinafter.

Briefly, in a first aspect of the present invention, a vibration attenuating member includes at least first, second and third generally coterminous layers, the first coterminous layer being composed of a viscoelastic material having a Shore 00 durometer of less than 50 and a rebound percentage of less than 20, the second and third coterminous layers being composed of foam material, with the first coterminous layer being sandwiched between the second and third coterminous layers.

In a second aspect of the present invention, a method of manufacturing the vibration attenuating member includes the steps of preforming locator holes in each of at least the first, second layers, positioning the first, second, and third layers with respect to each other by placing the locator holes of corresponding layers on pre-positioned locator pins disposed in predetermined positions, and securing the first, second and third layers together while they remain in the relative positions set by the locator pins.

BRIEF DESCRIPTION OF THE DRAWINGS

FIG. 6 is a front elevation of a preferred construction of a layer of viscoelastic material used in the vibration dampener of FIG. 3;

FIG. 7 is a cross-sectional view taken along line 7—7 of FIG. 6;

FIG. 8 is a graphical representation of the transmissibility (attenuation) of an example of the antivibration glove of the present invention;

Similar reference characters indicate similar parts throughout the several views of the drawings.

DESCRIPTION OF THE PREFERRED EMBODIMENTS

In the following description, the vibration attenuating member of the present invention is first described in connection with a vibration attenuating glove, for clarity of description. It is intended for use more broadly, however. In addition a method of manufacture is described.

Figure 1:
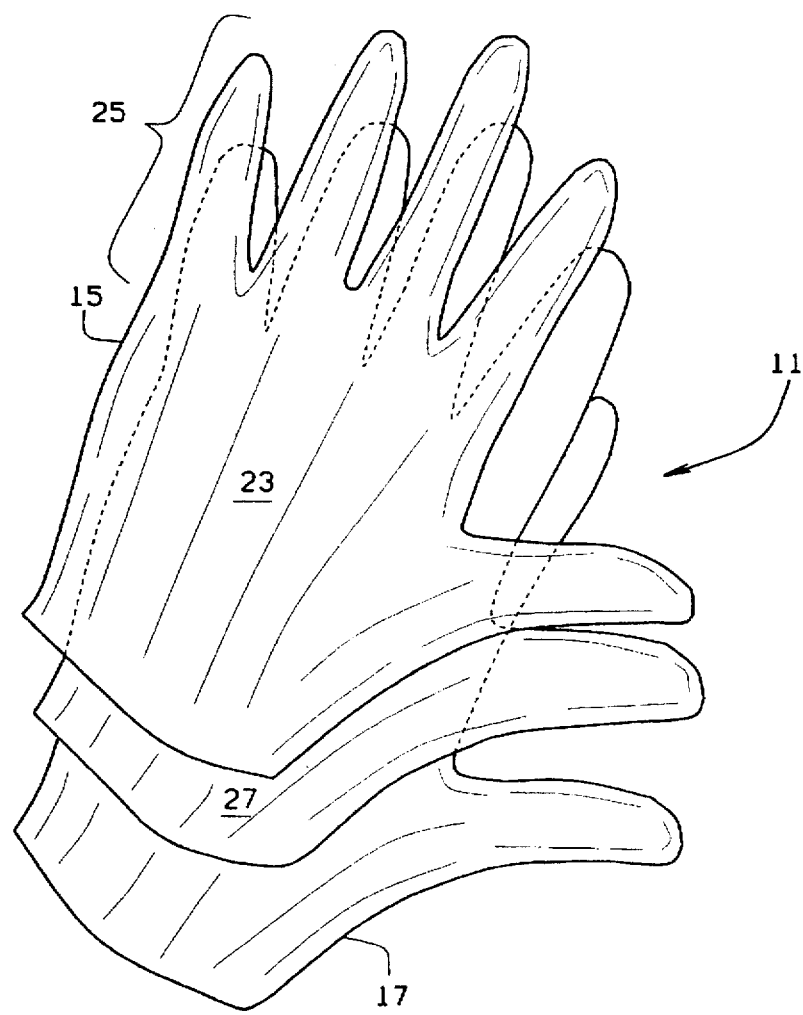
FIG. 1 is an exploded view illustrating the various components of an antivibration glove of the present invention.
Figure 2:
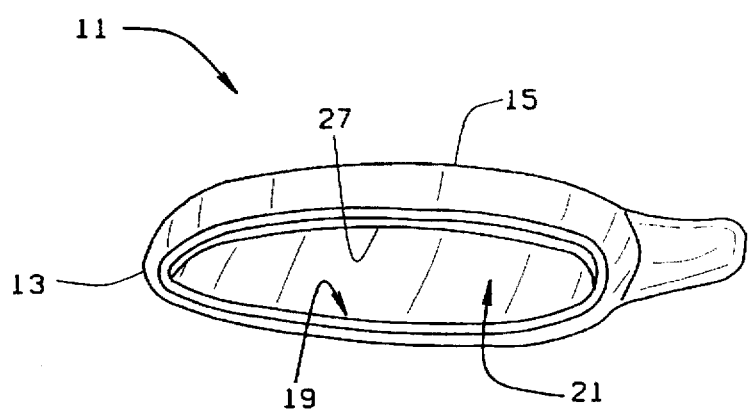
FIG. 2 is a base view of the antivibration glove of FIG. 1.

Turning now to the drawings and specifically to FIGS. 1 and 2, there is shown a vibration attenuating glove 11 of the present invention. Glove 11 includes a glove body 13 having a glove front 15 and a glove back 17. The glove front and glove back define an opening 19 for accepting a human hand and a recess 21 for receiving the hand. As can be seen in FIG. 1, glove front 15 includes a palm portion 23 and a finger portion 25. Glove front 15 and glove back 17 are made of any desirable material such as leather, spandex, cloth, coated cloth, dipped material, etc. The particular material used is a function of the environment in which the glove is to be used and does not appear to significantly affect the antivibration properties of the glove.

A vibration dampener 27 is disposed in glove recess 21 adjacent glove front 15. As shown in exaggerated fashion in FIG. 2, this causes the front portion of glove 11 to be somewhat thicker that the back portion of the glove.

Figure 3:
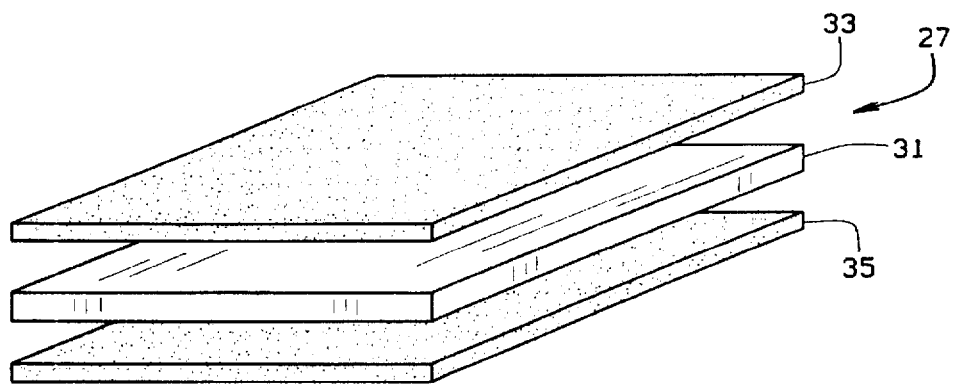
FIG. 3 is an exploded view of the construction of a vibration dampener used in the antivibration glove of FIG. 1.

The particular construction of vibration dampener 27 has been found to be significant in determining the antivibration properties of glove 11. It is preferred that vibration dampener 27 have at least first and second generally coterminous layers and is further preferred that it have three generally coterminous layers as shown in FIG. 3. For clarity of illustration, the various layers in FIG. 3 are shown as generally rectangular, but it should be understood that all layers in fact have the general hand-shape shown in FIG. 1.

It is preferred that the vibration dampener include coterminous layers of materials with differing properties. It is further preferred that at least one such layer be composed of a viscoelastic material having a Shore 00 durometer of less than 50 and a rebound percentage of less than 20. Such a layer is labeled 31 in FIG. 3. The second and optional third layers are preferably formed of a foam material. These layers are labeled 33 and 35 in FIG. 3 and form a sandwich construction in combination with viscoelastic layer 31. Alternatively, one or more of the foam layers 33 and 35 may be a laminated foam and fabric composite, with the outer surface of the layer being the fabric which is suitably adhered to the foam. In that case, it is preferred that the fabric be stretchable so as to stretch and rebound with the accompanying foam material. Of course, depending upon the application, more than three layers could also be used.

The foam layers may be made of any suitable foam, and are preferably each between 70 and 150 thousandths of an inch in thickness. For example, a ⅛" layer of polyether foam having an indentation force deflection of 25–35 psi and a pore density of 40 to 120 per inch has been found to work satisfactorily as layers 33 and 35. Similarly, a ⅛" layer of polyester foam having a compression load deflection of 25–55 psi (or more preferably approximately 40 psi) and a pore density in the above-mentioned range has also been found to work satisfactorily. Although these polyurethane foams work satisfactorily, other foams having similar physical properties could also be used.

The viscoelastic layer, layer 31, is generally in the form of a gel and may be made of any suitable material such as PVC, urethane or silicone rubber having the characteristics set forth above. It has been found that a PVC dispersion (plastisol) having a Shore 00 durometer of 38.5 and a rebound percentage of 13.5% works well as layer 31. The preferred material has a specific gravity of 1.12, although the specific gravity of the viscoelastic material is not believed to be critical. The plastisol is a relatively weak material in terms of tensile and elongation properties, so that it easily takes the shape of the glove as manipulated by the user.

Figure 4:
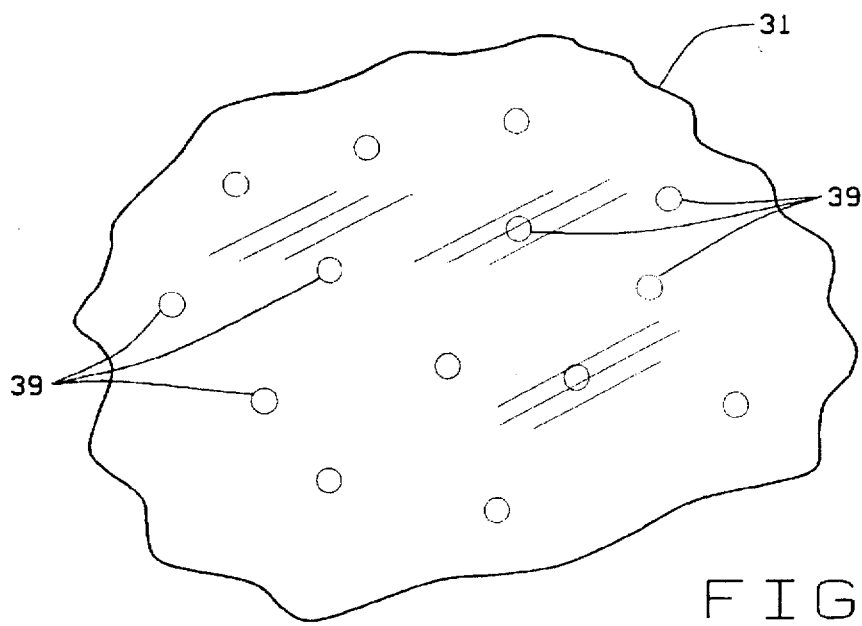
FIG. 4 is a top plan of a sheet of a particular material useful in the vibration dampener of FIG. 3.

As indicated in FIG. 4, it has been found that the presence of air bubbles 39 of a predetermined size and density embedded in viscoelastic layer 31 does not significantly reduce its antivibration properties and may, in fact, improve those properties. Such gas-filled voids may be generated deliberately or may be a natural consequence of a conventional manufacturing process. It is preferred that they be dispersed throughout the viscoelastic layer.

Figure 5:
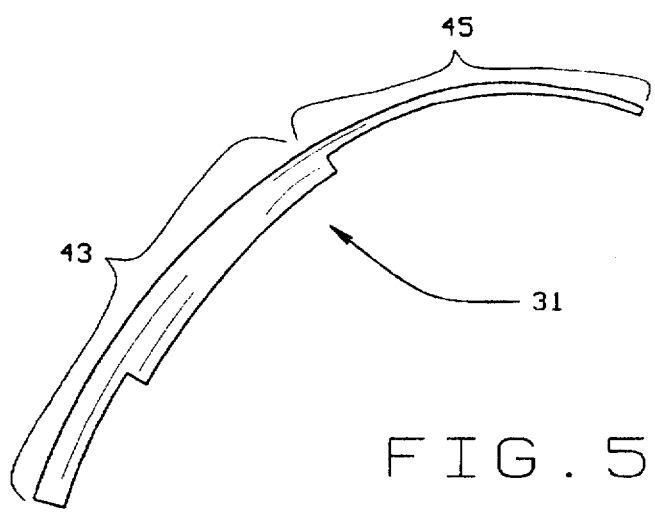
FIG. 5 is a side elevation of a preferred construction of a layer of viscoelastic material used in the vibration dampener of FIG. 3.

As shown in FIGS. 5 and 6, it is preferred that layer 31 of viscoelastic material be preformed in a non-uniform shape. For example, it is preferred that viscoelastic layer 31 be cast as a single piece in a precurved shape corresponding to the natural curvature of a human hand. (Of course, layer 31 could also be made of individual viscoelastic pieces suitably secured to the remainder of the glove, but this does increase the cost of construction.) The viscoelastic material itself is so pliable that the layer 31 does not force glove 11 into the precurved shape, but the precurved shape of this layer (and the material's memory of this shape) does facilitate bending and normal manipulation of the glove. Also shown in FIG. 5 is a taper or stepping of layer 31 which provides more vibration damping material near the palm and wrist (indicated by numeral 43) and correspondingly less material in the finger area (indicated by numeral 45). Alternatively, area 43 could be of a first, larger width, and area 45 could be of a second, narrower width. For example, a width of ¼" in the palm/wrist area, tapering or stepped down to ⅛" or so in the finger area is believed to provide desirable vibration dampening in the respective areas of the glove. In general it is desired to provide more vibration attenuating material where the hand has little, and vice versa.

Turning to FIG. 6, finger creases 51 and palm creases 53 may be cast into viscoelastic layer 31 (or otherwise formed into the layer). These creases prevent bunching of the material (which makes the glove more comfortable to hold and eliminates an additional path for transmission of vibration), facilitate bending of the glove, and hence improve manipulation and control of the glove without significantly impacting upon the antivibration characteristics. It is preferred that the creases 53 extend substantially from one side of the vibration attenuating member to the other. Although the number of creases involved is not critical, that number should correspond to the natural creases in the human hand. It is desirable that the majority of the creases be nonintersecting, since the human hand has very few intersecting creases.

It should also be noted (see FIG. 7), the width of the finger protrusions 57 in layer 31 is somewhat greater than the corresponding width of the glove fingers themselves. This allows the viscoelastic material to assume the curved shape shown in FIG. 7 around the side of the wearer's finger, thereby providing additional antivibration protection to each finger.

Although the present embodiment is described in connection with a glove with fingers, it should be appreciated that a fingerless glove could be constructed in the same manner by the simple expedient of omitting the finger portions of all the various layers. Except when the claims so require, it is anticipated that both fingered and fingerless gloves or glove liners are included within the scope of the present invention.

It has been found that construction of an antivibration glove in accordance with the above description meets the aforementioned European standard. Specifically, as shown in FIG. 8, glove 11 dampens the applied vibration (when measured as specified in the standard) in the range of from 200 Hz to 1250 Hz by at least 40% for the palm portion and provides some antivibration protection for the finger portion of the glove (although the standard does not provide for testing the actual vibration protection at the fingers). Moreover, the glove has no resonant response greater than 1.0 below that range.

Figure 9:
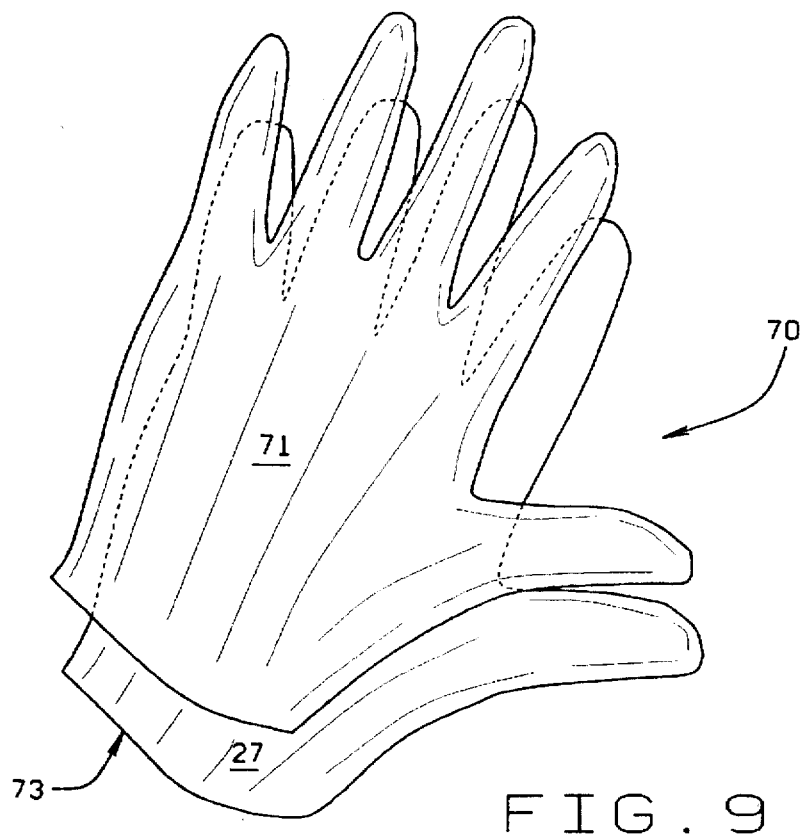
FIG. 9 is a view similar to FIG. 1 illustrating the construction of a glove liner of the present invention.

Although the vibration attenuating member 27 is described above in connection with a glove, it should be understood that it may readily be used instead as part of a glove liner 70. For example, in FIG. 9, the vibration attenuating member 27 may be suitably attached around most of its periphery (by sewing, for example) to a coterminous layer 71 of suitable elastic material such as spandex. By leaving the base 73 of the vibration attenuating member 27 unattached to the elastic layer 71 while attaching the peripheries of both layers together otherwise, a recess is left between the elastic layer and the attenuating layer which can accommodate the hand of a human wearer. The resulting glove liner may then be used in the conventional manner with a glove shell (not shown).

Similarly, the vibration attenuating member can be used to wrap the handle of a tool (such as a hammer, dental instrument, power saw, etc.) to attenuate the vibration resulting from use of the tool.

Figure 10:
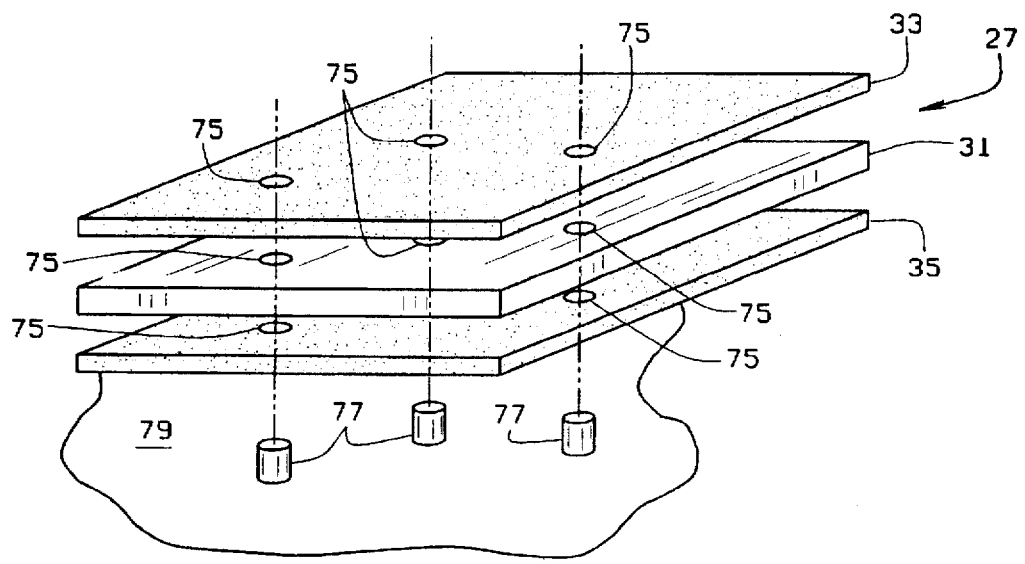
FIG. 10 is a perspective view illustrating a method of manufacture of the present invention.

In manufacturing vibration attenuating member 27, it is desirable to keep the various layers 31, 33, and 35 in proper registry during the manufacturing process. Referring to FIG. 10, this can be accomplished by providing a plurality of locator holes 75 in each layer of the member 27 and providing corresponding fixed locator pins 77 on a work surface 79. By placing the corresponding locator holes of the layers on the proper locator pins, all layers of the vibration attenuating member are accurately and quickly registered. The layers may then be suitably attached together by any suitable attachment method such as gluing, heat welding, or sewing, as desired. Alternatively, the locator holes in the top layer can be eliminated if it is possible to accurately place the top layer upon the bottom layers.

In view of the above, it will be seen that all the objects and features of the present invention are achieved, and other advantageous results obtained. The description of the invention contained herein is illustrative only, and is not intended in a limiting sense.

What is claimed is:

1. A vibration attenuating member comprising:
   at least first, second and third generally coterminous layers, said first coterminous layer being composed of a viscoelastic material having a Shore 00 durometer of less than 50 and a rebound percentage of less than 20, said second and third coterminous layers being composed of foam material, said first coterminous layer being sandwiched between the second and third coterminous layers.

2. The vibration attenuating member as set forth in claim 1 wherein the viscoelastic material is selected from the group consisting essentially of PVC, urethane and silicone rubber.

3. The vibration attenuating member as set forth in claim 1 wherein the viscoelastic material has a Shore 00 durometer no greater than about 40.

4. The vibration attenuating member as set forth in claim 1 wherein the rebound percentage of the viscoelastic material is no greater than about 15.

5. The vibration attenuating member as set forth in claim 1 wherein the viscoelastic material has a plurality of gas-filled voids therein of a predetermined size and density.

6. The vibration attenuating member as set forth in claim 1 wherein said foam material has an indentation force deflection in the range of from 25 to 35 psi.

7. The vibration attenuating member as set forth in claim 1 wherein the foam material has between 40 and 120 pores per inch.

8. The vibration attenuating member as set forth in claim 1 wherein the second coterminous layer has a thickness of approximately ⅛".

9. The vibration attenuating member as set forth in claim 8 wherein the third coterminous layer has a thickness approximately the same as the thickness of the second layer.

10. The vibration attenuating member as set forth in claim 1 wherein the layer of viscoelastic material is preformed in a non-uniform shape.

11. The vibration attenuating member as set forth in claim 10 wherein the layer of viscoelastic material has creases therein to facilitate manipulation of the vibration attenuating member.

12. The vibration attenuating member as set forth in claim 11 wherein the majority of the creases in the viscoelastic material layer are non-intersecting.

13. The vibration attenuating member as set forth in claim 11 whereto there are fewer than twenty creases in the layer of viscoelastic material.

14. The vibration attenuating member as set forth in claim 11 wherein at least a portion of the layer of viscoelastic material is in the shape of the outline of a human palm aid at least two of the creases in the layer of viscoelastic material extend from one side to the other side of the palm shape.

15. The vibration attenuating member as set forth in claim 14 wherein at least three of the creases in the layer of viscoelastic material extend from one side to the other side of the palm shaped portion of the layer of viscoelastic material.

16. The vibration attenuating member as set forth in claim 11 wherein the layer of viscoelastic material is in the shape of the outline of a human hand such that said layer has a palm portion and finger portions, at least some of the creases being disposed in the finger portions.

17. The vibration attenuating member as set forth in claim 16 wherein each finger portion includes at least two creases.

18. The vibration attenuating member as set forth in claim 11 wherein the layer of viscoelastic material is in the shape of the outline of a human hand, said creases being disposed to correspond to the natural creases of a human hand when curled.

19. The vibration attenuating member as set forth in claim 1 wherein the third coterminous layer has laminated thereto a layer of fabric.

20. The vibration attenuating member as set forth in claim 19 wherein the fabric layer is stretchable.

21. The vibration attenuating member as set forth in claim 10 wherein the layer of viscoelastic material is in the shape of a human hand having a palm portion and finger portions, said layer being relatively thicker adjacent the palm portion and relatively thinner adjacent the finger portions.

22. The vibration attenuating member as set forth in claim 1 wherein the layer of viscoelastic material is tapered from a first end toward an opposite end of the layer.

23. The vibration attenuating member as set forth in claim 10 wherein the layer of viscoelastic material has a curved shape corresponding at least in part to the rest position of a human hand.

24. The vibration attenuating member as set forth in claim 23 wherein the layer of viscoelastic material has a palm portion and finger portions, the finger portions being of a size to partially encircle the fingers of a human hand.

25. The vibration attenuating member as set forth in claim 1 further including an elastic member secured to at least a portion of the periphery of the first member and defining a recess between the first member and the elastic member.

26. The vibration attenuating member as set forth in claim 25 wherein the coterminous members and the elastic members have the shape of the outline of a human hand and the recess between the first member and the elastic member is sized to receive a human hand, whereby the vibration attenuating member constitutes a glove liner.

27. The vibration attenuating member as set forth in claim 1 further including a glove body having a glove front and a glove back, said glove front and glove back defining an opening for accepting a human hand and a recess for receiving said hand, said glove front including a palm portion and a finger portion, said coterminous layers being disposed in the glove recess adjacent the glove front.

28. The vibration attenuating member as set forth in claim 1 wherein the cotermindus layers are disposed to dampen applied vibration in the range of from 200 Hz to 1250 Hz by at least 40%.

29. The vibration attenuating member as set forth in claim 28 wherein below 200 Hz the vibration dampener has no resonant response greater than 1.0.

* * * * *

UNITED STATES PATENT AND TRADEMARK OFFICE
CERTIFICATE OF CORRECTION

PATENT NO. : 5,673,437
DATED : October 7, 1997
INVENTOR(S) : David D. Chase and Daniel A. Talonn It is certified that error appears in the above-indentified patent and that said Letters Patent is hereby corrected as shown below:

Column 6, line 35: Delete "aid" and insert therefor --and--;

Column 8, line 10: delete "cotermindus" and insert therefor --coterminous--.

Signed and Sealed this

Tenth Day of February, 1998

*Attest:*

BRUCE LEHMAN

*Attesting Officer*   *Commissioner of Patents and Trademarks*